United States Patent
Gadewar et al.

(10) Patent No.: US 12,282,902 B2
(45) Date of Patent: **\*Apr. 22, 2025**

(54) COMPUTER TRANSACTION SECURITY WITH DELEGATED DECISIONS

(71) Applicant: Marqeta, Inc., Oakland, CA (US)

(72) Inventors: Ritesh Gadewar, San Ramon, CA (US); Hariharan Venkatachalam, Dublin, CA (US); Radha Krishna Thakkalapally, Pleasanton, CA (US); Tory Hebert, New Iberia, LA (US)

(73) Assignee: Marqeta, Inc., Oakland, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/325,854

(22) Filed: May 30, 2023

(65) Prior Publication Data

US 2023/0306385 A1    Sep. 28, 2023

Related U.S. Application Data

(63) Continuation of application No. 17/125,033, filed on Dec. 17, 2020, now Pat. No. 11,704,632.

(51) Int. Cl.
| | |
|---|---|
| G06Q 20/02 | (2012.01) |
| G06F 9/54 | (2006.01) |
| G06Q 20/12 | (2012.01) |
| G06Q 20/34 | (2012.01) |
| G06Q 20/38 | (2012.01) |

(Continued)

(52) U.S. Cl.
CPC .............. *G06Q 20/02* (2013.01); *G06F 9/54* (2013.01); *G06Q 20/12* (2013.01); *G06Q 20/351* (2013.01); *G06Q 20/354* (2013.01); *G06Q 20/385* (2013.01); *G06Q 20/388* (2013.01); *G06Q 20/40145* (2013.01); *G06Q 20/405* (2013.01); *H04L 63/0838* (2013.01); *H04L 63/0861* (2013.01)

(58) Field of Classification Search
None
See application file for complete search history.

(56) References Cited

U.S. PATENT DOCUMENTS

2016/0140558 A1\* 5/2016 Groarke ............... G06Q 20/405
705/44

\* cited by examiner

*Primary Examiner* — Scott S Trotter
*Assistant Examiner* — Amit Patel
(74) *Attorney, Agent, or Firm* — Ray Quinney & Nebeker; James Bullough (57) ABSTRACT

A method for authenticating e-commerce transactions involves receiving, from a payment network computer, a first authentication request message to authenticate a transaction associated with a payment account, the first authentication request message being initiated by an issuer domain computer not implementing a 3-D Secure authorization protocol, determining that the issuer domain computer has configured, at the access control server computer, a decision function of a second portion of the 3-D Secure authorization protocol and in response thereto, transmitting, to the issuer domain computer, a decision request message and information associated with the transaction, the decision request message requesting the issuer domain computer to determine an action for authenticating the transaction based on the information associated with the transaction and one or more programmatic rules of the issuer domain computer, the transmitting occurring in lieu of the access control server computer executing the decision function at the access control server computer.

20 Claims, 3 Drawing Sheets

(51) Int. Cl.
*G06Q 20/40* (2012.01)
*H04L 9/40* (2022.01)

COMPUTER TRANSACTION SECURITY WITH DELEGATED DECISIONS

CROSS REFERENCE TO RELATED APPLICATIONS

This application is a Continuation of U.S. application Ser. No. 17/125,033, filed on Dec. 17, 2020, the entirety of which is incorporated herein by reference.

FIELD OF THE DISCLOSURE

One technical field of the disclosure is computer security concerning the communication of messages for transactions that contain sensitive card data. Another technical field is authenticating e-commerce transactions under the 3-D Secure authorization protocol.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Three-Domain Secure ("3-D Secure" or "3DS") protocol has been designed to provide an additional security layer for computer-implemented online credit, debit, and pre-paid card transactions that require transmitting messages over open computer networks. The name refers to the "three domains" which interact using the protocol. The three domains are (1) the acquirer domain, which includes the bank and the merchant to which the money is being paid to, (2) the issuer domain, which includes the card issuer (e.g., bank that issued the card being used) and the access control server ("ACS") (e.g., payment processor), and (3) the interoperability domain, which includes the card network that supports the 3DS protocol.

3DS adds security by requiring certain transactions to be authenticated, or "challenged," by requiring the cardholders to verify the transactions using electronic devices. For example, when an online merchant initiates the 3DS protocol during a computer-implemented checkout, the cardholder may be required to enter a one-time passcode ("OTP") using a computer device, received via email or SMS at the device, before the merchant processes the payment.

3DS allows certain transactions to be exempted from the additional authentication measures in cases where the transactions are determined as low-risk transactions. Determining whether the transaction is a low-risk transaction, or whether the transaction should be challenged or exempted from the additional authentication measures ("3DS challenge decision"), is performed by an entity implementing the 3DS protocol. Such an entity must be a 3DS certified service provider.

However, obtaining certification as a 3DS service provider is not simple or fast. The prospective service provider must write software code to implement 3DS and undergo a certification test and audit by the payment networks. The service provider must establish highly secure network infrastructure with the capability to process millions of transactions at extremely high speed to meet short response times per transaction mandated by the payment networks. Moreover, while the merchant-facing side of the payments ecosystem has seen significant technology innovation over the last several years, the issuer-facing side has remained largely stagnant. Entities within the issuer domain have historically relied on inflexible and complicated legacy issuer processor infrastructure, making it difficult for those entities to participate in the 3DS protocol. This in turn makes launching new card programs and supporting cutting-edge use cases difficult and time-consuming—ultimately stifling innovation. Consequently, there is a need for entities that are not 3DS certified, in particular those within the issuer domain, to have a simple and secure way to execute a 3DS challenge decision based on independent programmed, computer-implemented rules for risk assessment, without the overhead of being 3DS certified service providers themselves.

SUMMARY OF THE INVENTION

The appended claims may serve as a summary of the invention.

BRIEF DESCRIPTION OF DRAWINGS

A better understanding of the features and advantages of the present invention will be obtained by reference to the following detailed description that sets forth illustrative embodiments, in which the principles of the invention are utilized, and the accompanying drawings of which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in the sections below according to the following outline:
1. General Overview
2. Structural Overview
3. Functional Overview
4. Implementation Example—Hardware Overview
5. Extensions And Alternatives

1. General Overview

To allow computers in networks that are owned, operated by, or associated with entities that are not 3DS certified to execute a challenge decision under 3DS, such as determining whether the transaction is low-risk, or whether the transaction should be challenged or exempted from the additional authentication measures, there is a need for a computer systems, programmed algorithms, and other technical solutions to delegate the 3DS challenge decision from a computer of a 3DS certified service provider to a computer of a non-3DS certified entity efficiently and safely. There is a need to execute such a computer-implemented delegation using means by which transaction speed is not substantially hindered and the level of security provided by the 3DS protocol is maintained.

In an embodiment, methods are disclosed for delegating the 3DS challenge decision to non-3DS certified service providers, such as a card program server within the issuer domain, allowing them to execute local rules or other programmatic, computer-implemented risk analysis to evaluate a transaction and determine whether to challenge the transaction or exempt it from additional authentication measures.

In one aspect, a computer-implemented method for authenticating e-commerce transactions comprises, by one or more computer devices of an access control server computer, receiving, from a payment network computer, a first authentication request message to authenticate a transaction associated with a digital electronic payment account, the first authentication request message being initiated by an issuer domain computer not implementing a 3-D Secure authorization protocol; validating the first authentication request message according to a portion of the 3-D Secure authorization protocol; determining that the issuer domain computer has configured, at the access control server computer, a decision function of a second portion of the 3-D Secure authorization protocol and in response thereto, transmitting, to the issuer domain computer, a decision request message and information associated with the transaction, the decision request message requesting the issuer domain computer to determine an action for authenticating the transaction based on the information associated with the transaction and one or more programmatic rules of the issuer domain computer, the transmitting occurring in lieu of the access control server computer executing the decision function at the access control server computer; receiving, in response to the decision request message, an indication for an action for authenticating the transaction based on the decision request message sent to the issuer domain computer; executing the indicated action to authenticate the transaction.

In one feature, the receiving the indication for the action comprises receiving a decision response message from the issuer domain computer specifying the indicated action. Alternatively, the receiving the indication for the action comprises determining that the issuer domain computer has not responded to the decision request message within a specified time period; determining the action based on a default action.

In another feature, the executing the indicated action comprises transmitting, to a digital electronic address associated with the payment account, a second authentication request message comprising a one-time password and instructions to input the one-time password in a payment application running on a user computer, the payment application having been used to initiate the transaction; receiving a confirmation message from the payment application indicating that an input password received by the payment application matches the one-time password; transmitting, to the issuer domain computer, an authentication response message specifying that the transaction is authenticated. Alternatively, the executing the indicated action comprises transmitting a second authentication request message to a payment application running on a user computer associated with the payment account, the payment application having been used to initiate the transaction, the second authentication request message requesting the payment application to authenticate the transaction based on biometric sensors of the user computer; receiving, from the payment application, an API call comprising a payload verification value specifying that a user associated with the user computer has been authenticated based on the biometric sensors in response to the second authentication request message; transmitting, to the issuer domain computer, an authentication response message specifying that the transaction is authenticated.

2. Structural Overview

Figure 1:
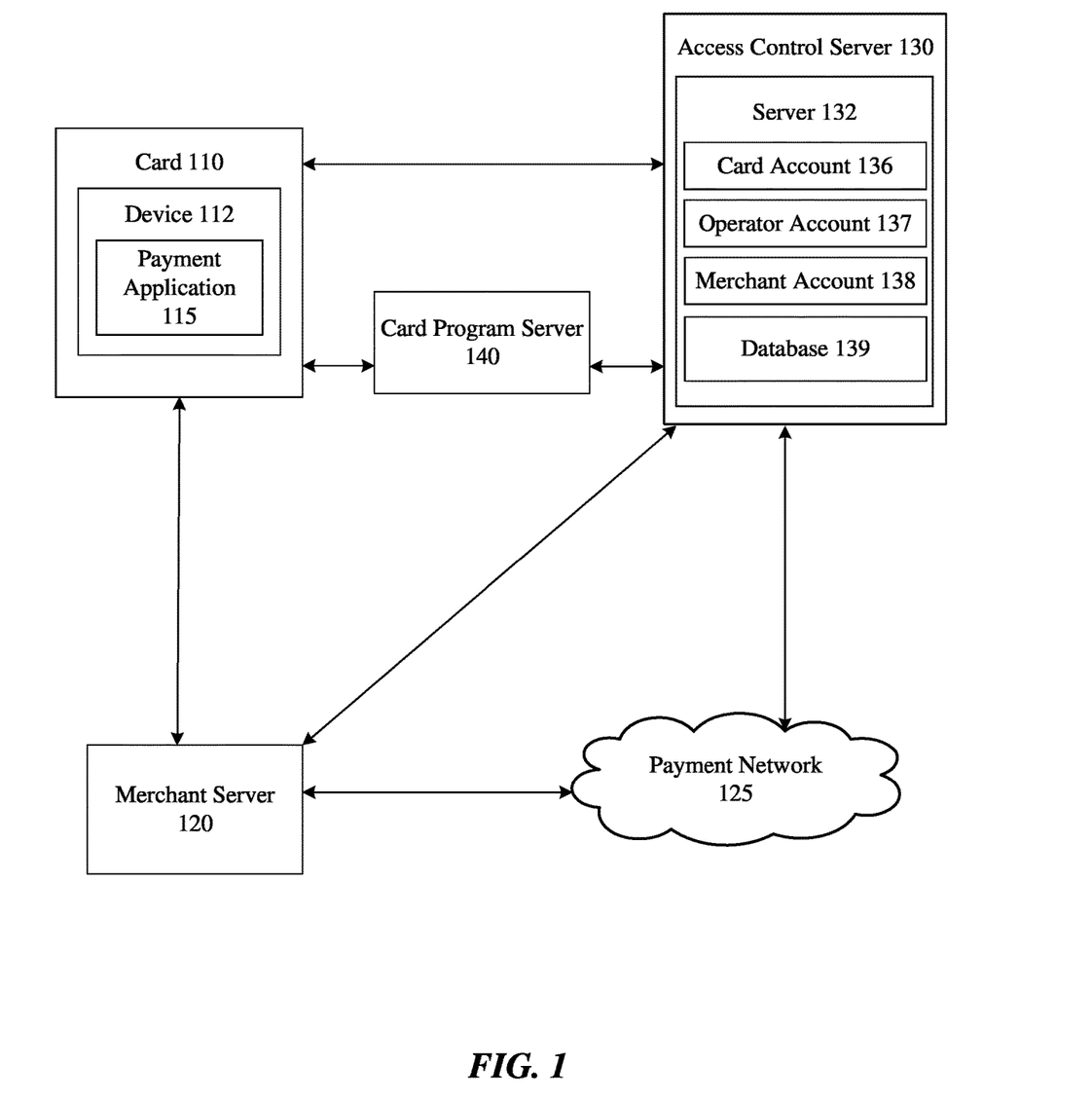
FIG. 1 is a diagram of a distributed computer system including computers that communicate certain aspects of authentication messages in computer networks, according to an embodiment.

FIG. 1 is a diagram of a distributed computer system including computers that communicate certain aspects of authentication messages in computer networks, according to an embodiment.

In an embodiment, computers in an acquirer domain include a merchant server 120. The acquirer domain may also include computers associated with acquiring bank and acquirer processors, which are omitted as not germane to the specific techniques disclosed herein. The merchant server 120 is owned, operated by, or associated with an entity that supplies goods or services to consumers, such as to a cardholder using a payment card 110 via a computing device 112. Merchant server 120 may be termed, alternatively, a supplier server. The merchant server 120 may owned, operated by, or associated with an entity that can supply goods, services, or a combination thereof to consumers associated with a point of sale or other entities or institutions. A merchant may be a supplier, a retailer, reseller, value-added reseller, distributor, or other entity in a supply chain or manufacturing chain. A merchant may deal in tangible goods and/or intangible goods, using physical retail, resale, or distribution facilities and/or virtual, online stores, shopping carts, catalogs, or other facilities.

In an embodiment, the card 110 is a physical payment card or a virtual payment card associated with a person or entity that is used in a transaction to purchase goods or services from the merchant server 120 using online, distributed computing techniques. A purchase transaction may include a payment transaction. Each payment transaction is associated with a payment application 115 that a computing device 112 hosts or executes for use of the card 110 to initiate the transaction. Examples of payment application 115 include a smartphone application or a web application running on a browser of computing device 112. Examples of the computing device 112, which may also be referred herein as the card device 112, include a mobile computing device, smartphone, laptop computer, desktop computer, or workstation. In an embodiment, the computing device 112 may be associated with biometric sensors for authenticating the cardholder based on face, eyes/iris, voice, or fingerprint.

In an embodiment, the issuing domain entities include an access control server 130, a card program server 140, and a card issuing bank. The card issuing bank is omitted as not germane to the specific techniques disclosed herein. In one embodiment, the access control server 130 may be a virtual card issuer of the payment card being used for the transaction, allowing the access control server to act as both card issuer and payment processor. In an embodiment, the access control server 130 is an issuer-processor that includes both the entity processing the payment transaction and the entity issuing the payment card and computers and networks to implement those entities.

The card program server 140 may be owned, operated by, or associated with an entity that operates or manages payment card programs. The card program server 140 may be associated with an entity that has a customer relationship with another entity, such as an access control server, a payment processor, or a card issuer, that owns, operates, or is associated with the computers and/or servers used to process payment transactions. However, a customer relationship is not required. The card program server 140, via the access control server 130 or the card issuing bank, is able to customize the functionality of the card for where and how a card is used and manage the issuance of the card over the card's lifecycle, such as by ordering, activating, setting expiration, suspending, and terminating cards. In an embodiment, the payment application 115 running on the card device 112 may be operated by or is associated with the card program server 140. For example, to verify or authenticate a payment transaction, the card program server 140 may request the cardholder, through the payment application 115, to provide biometric input to the card device 112 associated with the payment application 115.

In an embodiment, the card program server 140 may be associated with a decision service that determines the 3DS challenge decision on behalf of the card program server 140. The decision service may use a set of executable program instructions stored on a computer associated with the card program server 140 to determine the 3DS challenge decision on behalf of the card program server. In an embodiment, both the card program server 140 and the decision service referenced herein are not 3DS certified service providers and cannot participate in the 3DS authentication process except with the structure and processes provided by this disclosure. The embodiments of this disclosure, for the sake of brevity, may only reference the card program server 140 in describing the processes involved with the delegation of the 3DS challenge decision, however, all references to the card program server 140, wherever applicable, also apply to the decision service.

The access control server 130 may be associated with one or more server computers and/or virtual machine instances (shown as the server 132) that are programmed to implement the functions that are further described herein. The one or more server computers and/or virtual machine instances may be owned or operated by the access control server 130, but other entities also may implement functionally equivalent computers or programs. The one or more server computers and/or virtual machine instances may be architected with load-balancing routers, multiple processors, clusters, or virtual machine instances, work queues, multithreaded programming, and parallel processing to operate with real-time response to requests from the payment network 125 and card program server 140 as computers associated with the card device 112 and the merchant server 120 are conducting transactions at the scale of thousands to millions of requests per second.

In one embodiment, the server 132 comprises a digital storage device or database 139 that is programmed with a database schema or other form of organized, high-speed, digital storage and manages the merchant account 138 and card account 136. Database 139 may represent any digital data storage device or repository including combinations of database clusters, relational databases, object storage or other repositories.

Card account 136 represents a virtual payment card that has been issued to a party such as the cardholder and managed using card device 112. Each card account 136 may include or be associated with digitally stored data of attributes of the account. Example attributes include a type of the payment account, age of the payment account, expiration date of the payment account, phone number, or email address associated with the payment account. In an embodiment, the entirety, or portions, of the digitally stored data of the card account 136 may have been programmatically specified or customized by the card program server 140.

Operator account 137 represents a digitally stored association of data that describes an entity overseeing or managing a card program, such as the card program server 140. The operator account 137 enable the system to differentially process stored program rules for different card program servers to implement different policy concerning approval of transactions, 3DS authorization preferences, funding of transactions, use of cached balances, and/or denial of transactions. Each operator account 138 may include or be associated with digitally stored data of attributes of the account. Example attributes include the card program server's preference on the type of the 3DS authentication method (e.g., authentication by biometric inputs or one-time password) or the conditions or situations to which the 3DS challenge decision should be delegated to the card program server 140.

Merchant account 138 represents a digitally stored association of data that describes a merchant, or a supplier, such as the merchant server 120. The merchant account 138 enable the system to differentially process stored program rules for different merchants to implement different policy concerning approval of transactions, 3DS authorization preferences, funding of transactions, use of cached balances, and/or denial of transactions. Each merchant account 138 may include or be associated with digitally stored data of attributes of the account. Example attributes include business address, type of goods or services provided.

For purposes of clarity, FIG. 1 illustrates one instance of the card account 136, operator account 137, and merchant account 138. In practical embodiments, the server may be architected with sufficient CPU power, memory, and storage to process hundreds of operator accounts 137, thousands of merchant accounts 138, and/or millions of card accounts 136.

In an embodiment, the interoperability domain entity is a payment network 125, which is a secure, private network for communication of payment protocol messages between the computers of authorized parties such as banks, payment clearinghouses, merchants, card issuers, and access control servers. Because payment network 125 comprises a plurality of computers, software, and specialized networking gear, the terms "payment network" and "payment network computer" may be used interchangeably for convenience to refer to all functional elements in a payment network.

3. Functional Overview

Figure 2:
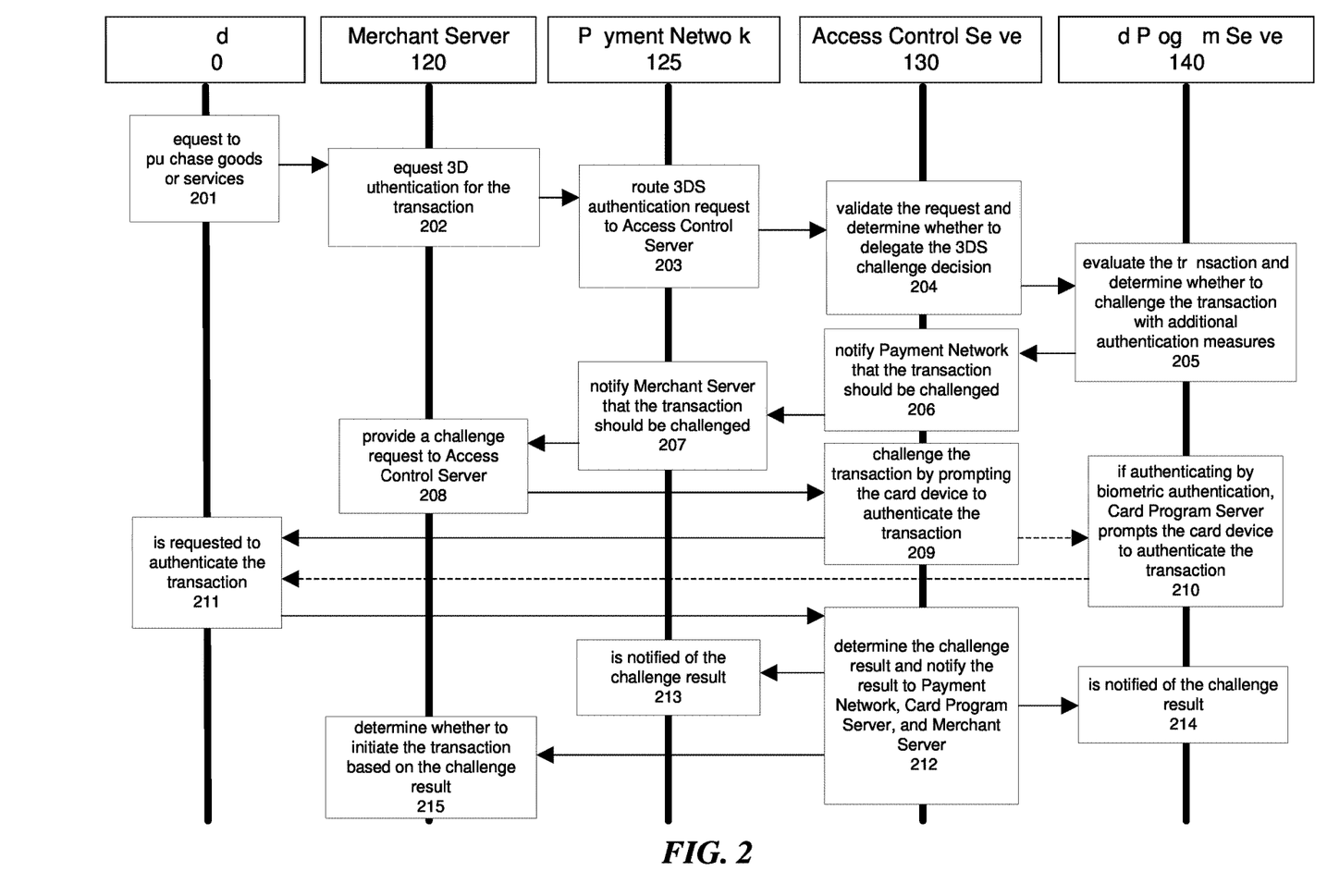
FIG. 2 is a sequence diagram that illustrates a computer-implemented data authentication process that may serve as an algorithm for programming an embodiment.

FIG. 2 is a sequence diagram that illustrates a computer-implemented data authentication process that may serve as an algorithm for programming an embodiment. FIG. 2 and each other diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

FIG. 2 specifically illustrates a sequence of electronic transmissions of messages and data that may form one embodiment of a method for delegating a portion of the 3DS protocol to a non-3DS certified party or to a computer that does not implement 3DS protocol. In an embodiment, the 3DS challenge decision is programmatically delegated from one computer to another using a novel set of programmed messages, tests, transformations and responses, as further described. The 3DS challenge decision is directed to determining whether additional authentication measures are necessary to verify an online payment transaction initiated by a cardholder.

In one embodiment, the process of FIG. 2 is implemented using the distributed computer system of FIG. 1. In one embodiment, access control server 130, card program server 140, and merchant server 120 are programmed with sets of instructions to implement the sections of FIG. 2 that are associated respectively with the access control server 130, card program server 140, and merchant server 120. For example, each functional unit may include a 3DS protocol module, or stored program instructions organized under another name, to implement FIG. 2 and the techniques otherwise described herein.

In an embodiment, for a given transaction involving a cardholder using a card 110 to purchase goods or services from a merchant server 120, the 3DS authentication process begin when the merchant server 120 requests the transaction be authenticated under the 3DS protocol. The merchant's 120 authentication request transmits to the payment network 125, which gets routed to the access control server 130 in the issuer domain. The access control server 130, who is a 3DS certified service provider, may first validate the transaction, e.g., by verifying whether the authentication request is in a correct format. Then, the access control server 130 determines whether the 3DS challenge decision should be delegated to a different entity, e.g., card program server 140. If the 3DS challenge decision is to be delegated to the card program server 140, the access control server 130 may provide certain information about the transaction and the card 110 to allow the card program server 140 to evaluate the transaction based on thereof. Based in part on the received information, the card program server 140 determines whether to challenge the transaction based on its own policies and risk analysis. The 3DS challenge decision evaluates whether the transaction should be challenged with, or exempted from, additional authentication measures. If the transaction is to be challenged, the access control server 130 requests the cardholder to verify the transaction, e.g., based on a one-time password, knowledge-based authentication, or biometric authentication. If the transaction is to be exempted, the transaction is authenticated without implementing additional authentication measures and without the involvement of the cardholder.

Referring now to FIG. 2, in an embodiment, a computer-implemented method may begin at step 201 when a card device 112 requests a payment transaction to purchase goods or services provided by a merchant server 120. In an embodiment, when card device 112 is interacting electronically over a network with the merchant server 120, for example with an online store or shopping card, the merchant computer is programmed to initiate the payment transaction.

At step 202, the merchant server 120 is programmed to request the transaction to be authenticated based on the 3DS protocol. This authentication request is electronically sent to the payment network 125.

At step 203, the payment network 125 routes the authentication request to a card issuer or to an issuer-processor such as the access control server 130. In some embodiments, the access control server 130 may be a virtual card issuer of the payment card being used for the transaction, allowing the access control server 130 to act as both the card issuer and the payment processor, but operation with an issuer-processor is not required.

At step 204, the access control server 130 is programmed to validate the authentication request. In an embodiment, validation comprises programmed, computer-implemented inspection of the request, data attributes in the request, and values of the attributes, format verification, or other checks. In an embodiment, the access control server 130 is programmed to assign a unique transaction identifier to each authentication request so the request can be identified throughout the processes shown in FIG. 2.

In an embodiment, the access control server 130 is programmed to determine whether to delegate the 3DS challenge decision to the card program server 140 based on several factors, which may be implemented by programmed rules, tests, or other logic. In an embodiment, the access control server 130 is programmed to automatically delegate the 3DS challenge decision to card program server 140 after receiving the authentication request or after validating the request. In an embodiment, the access control server 130 is programmed to provide certain information about the transaction, such as those associated with the card account 136, operator account 137, or merchant account 138, to allow the card program server 140 to evaluate the level of risk associated with the transaction. For example, the data transmitted from the access control server 130 may include date and time of initiating transaction; location of initiating the transaction; date and time of initiating authentication request; location of initiating authentication request; identification of the payment network 125 for the transaction; identification of the authentication requester such as the merchant server 120; type of payment, such as one-time payment, recurring payment, installment payment, payment using a new card; whether the card 110 was previously authenticated, if so, the dates and times of the authentications; whether the card 110 was previously challenged, if so, the dates and times of the challenges; the channel of interface used to initiate the transaction, such as an application on a mobile device or a web application on a browser; the type of device used by the cardholder for the transaction; card information, such as type of the payment account, age of the payment account, expiration date of the payment account, phone number or email address associated with the payment account; and merchant information, such as business address, type of goods or services provided.

In an embodiment, instead of delegating the 3DS challenge decision automatically, the access control server 130 determines whether to delegate the 3DS challenge decision in real-time by evaluating the information described above. For example, the access control server 130 may be programmed to delegate the 3DS challenge decision to the card program server 140 only during a specific time period, when the transaction involves a particular merchant or particular type of goods or services, when the transaction involves large sum of payment, or if certain conditions of suspicious activities are detected, such as multiple transactions being initiated in locations far from each other but close in time.

In an embodiment, to maintain the integrity of the security provided under the 3DS protocol, the access control server 130 is programmed to transmit only non-sensitive information, or information that has been desensitized, to the card program server 140. For example, instead of providing the identification number associated with the card 110, the access control server 130 is programmed to provide the card program server 140 a token for the payment card, safeguarding the payment card's identification number.

At step 205, the card program server 140 is programmed to determine whether the transaction should be challenged, or exempted, based in part on the information received from the access control server 130. FIG. 2 illustrates an embodiment where the card program server 140 is programmed to determine that the transaction should be challenged with additional authentication measures. In an embodiment where the 3DS challenge decision is not delegated, the access control server 130 is programmed to determine the 3DS challenge decision.

In an embodiment, the access control server 130 is programmed to provide the card program server 140, a limited period of time to determine the 3DS challenge decision and respond with a determination. In such an embodiment, the limited time frame may correspond to a time frame programmed with the access control server 130 and/or the card program server 140 prior to the 3DS authentication request. In other embodiments, the time frame may be calculated in real-time as a fixed portion of the total length of time the access control server 130 has been programmed to use for authenticating the transaction. For example, if the access control server 130 is programmed to use seven seconds as the total length of time for responding to the authentication request, then the access control server 130 is programmed to require the card program server 140 to determine the 3DS challenge decision within three seconds.

In an embodiment, the card program server 140 is programmed to transmit a challenge score with a determination of the 3DS challenge decision. The challenge score is programmed to represent a statistical confidence level output from a statistical calculation algorithm that implements the card program server 140's decision to challenge, or exempt, the transaction. For example, a high challenge score may represent that the card program server 140 has executed an algorithm that has output high confidence that the decision was accurately determined. Alternatively, the challenge score may represent the level of risk involved with the transaction. For example, transactions with highly suspicious activities may be given a high challenge score.

In an embodiment, the card program server 140 is programmed to provide the rationales for its determination of the 3DS challenge decision. In an embodiment where the card program server 140 determines that the transaction should be challenged, it also specifies how the card device 112 should be challenged. For example, the card program server 140 may specify that the card device 112 should be challenged based on a one-time password, biometric authentication, or knowledge-based authentication in which the cardholder is asked to answer at least one knowledge question that, in theory, only the cardholder should know the answer to.

If the transaction is to be challenged, at step 206, the access control server 130 is programmed to notify the payment network 125 that the card device 112 should be challenged.

At step 207, the payment network 125 is programmed to notify the merchant server 120 that the card device 112 should be challenged.

At step 208, the payment network 125 is programmed to transmit to the access control server 130 a challenge request, requesting the access control server 130 to challenge the card device 112 with additional authentication measures.

At step 209, the access control server 130 is programmed to determine whether to challenge the transaction based on a one-time password, biometric authentication, or knowledge-based authentication. In embodiments where the transaction is to be exempted from the additional authentication measures, the access control server 130 is programmed to notify the merchant server 120, card program server 140 and/or the payment network 125 that the transaction is authenticated without requiring the card device 112 to authenticate the transaction.

In an embodiment, the access control server 130 is programmed to determine the method of challenging the transaction on various factors, for example, based on the type of channel interface the card device 112 used to initiate the transaction. Examples of the types of channel interface include a payment application running on the card device 112, such as a smart phone application, or a web application running on a browser of the card device 112.

In an embodiment, the access control server 130 is programmed to consider authenticating based on biometric authentication, such as face, eye/iris, voice, fingerprint identifications only if the card device 112 supports such biometric authentication. In an embodiment, if biometric authentication is available on the card device 112, the access control server 130 is programmed to determine whether to use biometric authentication or one-time password based on the preference of the card program server 140, which may have been indicated to the access control server 130 prior to the transaction. In other embodiments, the card program server 140 is programmed to recommend the method of authentication when it transmits its determination of the 3DS challenge decision to the access control server 130. In some embodiments, the access control server 130 is programmed to establish a default authentication method that gets implemented unless otherwise specified by the card program server 140.

If the transaction is to be authenticated based on a one-time password, the access control server 130 is programmed to provide the one-time password to an email address associated with the card's payment account or to the mobile device associated with the card 110 via a message such as an SMS message. The one-time password may be provided with instructions to input the one-time password in a payment application, or a web application, 115 used to initiate the transaction.

If the transaction is to be authenticated based on knowledge-based authentication, the access control server 130 is programmed to provide the card device 112 with a knowledge question that, in theory, only the cardholder should know the answer to. The access control server 130 may be programmed transmit the knowledge question to an email address associated with the card's payment account or to the mobile device associated with the card 110 via a message such as an SMS message, or alternatively the access control server 130 may be programmed to request the card program server 140 to provide the card device 112 the knowledge question via the payment application 115 associated with the card device 112. In an embodiment, the card device 112 may provide an answer to the knowledge question in a payment application, or a web application.

If the transaction is to be authenticated based on biometric authentication, the access control server 130 is programmed to request the card program server 140 to challenge the card device 112 via the payment application 115 associated with the card device 112. In such a scenario, at step 210, the card program server 140 is programmed to prompt the card device 112 to authenticate based on biometric authentication.

At step 211, the transaction is challenged by requesting the card device 112 to authenticate the transaction. In an embodiment, the card device 112 is provided several attempts to successfully complete the challenge process. For example, if authenticating by one-time password and the card device 112 fails to transmit a password matching the one-time password, the access control server 130 is programmed to iteratively provide additional requests electronically to the card device 112, each with a new one-time password. If authenticating by knowledge-based authentication and the card device 112 fails to transmit the correct answer to a question, the access control server 130 is programmed to provide the card device 112 several opportunities to provide the correct answer, each with a different question. If authenticating based on biometric authentication, the access control server 130 is programmed to request the payment application running on the card device 112, which may be operated by the card program server 140, to authenticate the transaction based on biometric sensors associated with the device. Then, the card program server 140 is programmed to provide the card device 112 several attempts to successfully authenticate based on biometric input. After the card device 112 completes the challenge request, whether successfully or unsuccessfully, the card device 112 is programmed to transmit the challenge result to the access control server 130.

At step 212, the access control server 130 is programmed to transmit a message to the payment network 125, card program server 140, and merchant server 120 specifying the result of the challenge process.

At step 213, the payment network 125 is notified of the challenge result.

At step 214, the card program server 140 is notified of the challenge result.

At step 215, the merchant server 120 is notified of the challenge result, and the merchant server 120 is programmed to determine whether to initiate the transaction based on the results of the challenge process.

The process of FIG. 2 as thus described provides a complete solution for authentication of one example transaction and request. However, as noted in connection with FIG. 1, in an embodiment, the access control server 130, card program server 140, merchant server 120, and payment network 125 are structured and architected to execute the example request as one request among thousands to millions of requests that are concurrently processed in real-time to permit thousands to millions of computing devices 112 to execute purchase transactions as users are waiting and to maintain high transaction throughput for the merchant computer. It will be apparent that these levels of request processing are beyond the limits of human capacity and require a high-speed, highly scalable, real-time response, computer system for practical use. Embodiments are directed to the practical deployment of a system like FIG. 1 and computer implementation of FIG. 2 and not to the organization of human activity, performing mental processes, or other operations that are tied to human activity or performance.

The disclosure to this point has explained a technical process by which computers that do not implement the 3DS protocol can execute local or specialized decision instructions, tests, or other logic to assess a transaction and return an instruction to decline or approve the transaction. These techniques provide a practical improvement in computer security concerning communication of messages for transaction that contain sensitive card data, and permit computers involved in a distributed system such as FIG. 1 to execute authentication of e-commerce transactions using 3-D Secure techniques in a manner not possible before because one or more of the computers was not 3DS compliant or certified.

In particular, to allow computers in networks that are owned, operated by, or associated with entities that are not 3DS certified to execute a challenge decision under 3DS, such as determining whether the transaction is low-risk, or whether the transaction should be challenged or exempted from the additional authentication measures, the disclosure provides computer systems, programmed algorithms, and a complete technical solution by which the challenge decision normally required in 3DS by a certified entity is programmatically delegated from a computer of a 3DS certified service provider to a computer of a non-3DS certified entity efficiently and safely. The disclosed techniques can execute such a computer-implemented delegation using means by which transaction speed is not substantially hindered and the level of security provided by the 3DS protocol is maintained.

Consequently non-3DS certified service providers, such as card program server that does not implement or are not approved to use 3DS, can execute local rules or other programmatic, computer-implemented risk analysis to evaluate a transaction and determine whether to challenge the transaction or exempt it from additional authentication measures. As a whole, these techniques provide a practical application of computing technology to achieve a functional result, and a set of processing steps, that have not been possible before.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
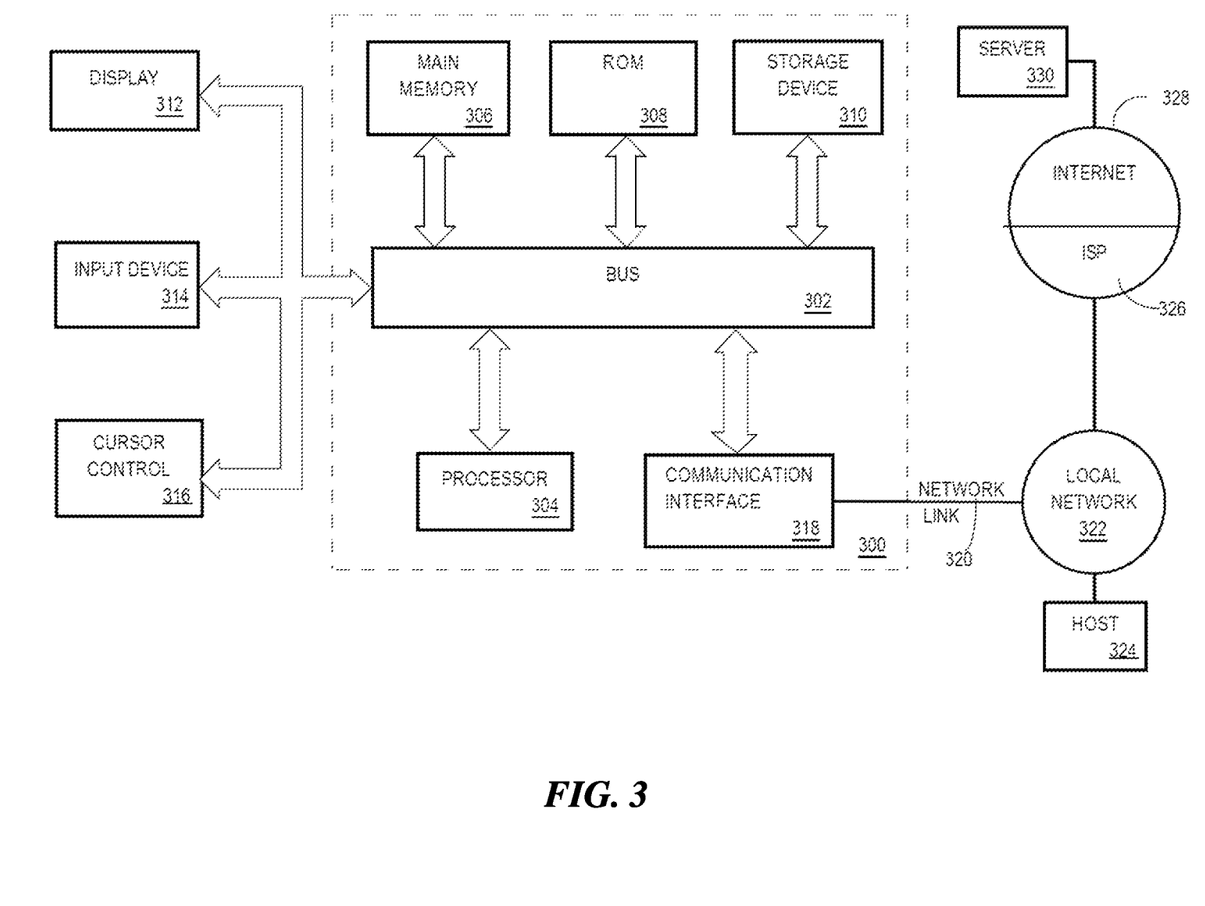
FIG. 3 is a block diagram that illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem which may include a bus 302 and/or other communication mechanism(s) for communicating information and/or instructions between the components of the computer system 300 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read-only memory (ROM) 308 or other static storage device coupled to I/O subsystem for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM and may be coupled to I/O subsystem for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem to at least one display 312 or another type of output device. In one embodiment, output device is a digital computer display. Examples of a display that may be used in various embodiments include a touch screen display or a light-emitting diode (LED) display or a liquid crystal display (LCD) or an e-paper display. Computer system 300 may include other type(s) of output devices, alternatively or in addition to a display device. Examples of other output devices include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device, input device 314, and control device 316 are omitted. Or, in such an embodiment, the input device 314 may comprise one or more cameras, motion detectors, thermometers, microphones, seismic detectors, other sensors or detectors, measurement devices or encoders and the output device may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem. Transmission media can also take the form of acoustic or light waves, such as those generated during radio-wave and infrared data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem such as placing the data on a bus. I/O subsystem carries the data to memory 306, from which the processor 304 retrieves and executes the instructions. The instructions received by memory 306 may optionally be stored on storage 310 either before or after execution by the processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host 324 (i.e., a host computer).

Furthermore, network link 320 may provide a connection through network 322 or to other computing devices via internetworking devices and/or computers that are operated by an Internet Service Provider (ISP). ISP 326 provides data communication services through a world-wide packet data communication network represented as internet 328. A server 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Extensions and Alternatives

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    receiving, at an access control server and from a payment computing network, a first authentication request message to authenticate a transaction associated with a digital electronic payment account, wherein the first authentication request message is from a plurality of authentication request messages that are concurrently processed in real-time;
    determining, by the access control server, which is a three-domain secure (3DS) certified service provider using a 3DS authorization protocol, to delegate a 3DS challenge decision of the transaction to a card program computing device within an issuer domain, wherein the card program computing device is a non-3DS certified service provider, and wherein the access control server provides the card program computing device with a limited period of time to determine the 3DS challenge decision and respond with a determination;
    based on determining to delegate the 3DS challenge decision to the card program computing device as a non-3DS certified service provider, transmitting transaction information to the card program computing device along with a decision request message to authenticate the transaction by determining whether to challenge the transaction with additional authentication measures;
    receiving, at the access control server, an indication to challenge the transaction in response to the decision request message;
    providing, by the access control server, a challenge request that includes an additional authentication measure to a computing device associated with the digital electronic payment account; and
    in response to receiving authentication of the additional authentication measure, transmitting an authentication response message to the payment computing network in real-time specifying that the transaction is authenticated.

2. The computer-implemented method of claim 1, wherein the access control server delegates the 3DS challenge decision to the card program computing device instead of the access control server performing the 3DS challenge decision.

3. The computer-implemented method of claim 1, wherein transmitting the decision request message to the card program computing device includes providing desensitized transaction information corresponding to a card account, a merchant account, or transaction details.

4. The computer-implemented method of claim 1, further comprising determining to delegate the 3DS challenge decision to the card program computing device during a specific time period.

5. The computer-implemented method of claim 1, further comprising determining to delegate the 3DS challenge decision to the card program computing device based on multiple transactions being initiated in separate locations within a given time period.

6. The computer-implemented method of claim 1, further comprising determining to delegate the 3DS challenge decision to the card program computing device based on a transaction value or type of goods and services included in the transaction.

7. The computer-implemented method of claim 1, wherein providing the challenge request to the card program computing device associated with the transaction includes providing a second authentication request message to a payment application running on the computing device, the second authentication request message requesting the payment application to authenticate the transaction according to an action specified in the challenge request.

8. The computer-implemented method of claim 1, further comprising validating, by the access control server, that the first authentication request message is in a correct format to the 3DS authorization protocol.

9. The computer-implemented method of claim 8, wherein validating the first authentication request message according to the 3DS authorization protocol includes inspecting data attributes and values attributes in the first authentication request message.

10. The computer-implemented method of claim 1, wherein:
the access control server receives the first authentication request message from a merchant computing device via the payment computing network; and
the first authentication request message requests that the access control server authenticates the transaction based on the 3DS authorization protocol.

11. The computer-implemented method of claim 1, wherein the transaction occurs between a merchant computing device within an acquirer domain and the card program computing device within the issuer domain.

12. The computer-implemented method of claim 1, wherein the card program computing device determines whether to challenge the transaction further based on:
local rules specific to the card program computing device; and
the digital electronic payment account that is stored locally in the issuer domain.

13. The computer-implemented method of claim 12, wherein the issuer domain is a non-3DS certified service provider.

14. The computer-implemented method of claim 1, wherein transmitting the authentication response message to the payment computing network in real-time in response to receiving the authentication of the additional authentication measure includes indicating that the transaction is authenticated to the card program computing device and a merchant computing device.

15. An access control server, comprising:
a processing system; and
computer memory having instructions that, when executed by the processing system, cause the processing system to perform operations comprising:
receiving, at the access control server and from a payment computing network, a first authentication request message to authenticate a transaction associated with a digital electronic payment account, wherein the first authentication request message is from a plurality of authentication request messages that are concurrently processed in real-time;
determining, by the access control server, which is a three-domain secure (3DS) certified service provider using a 3DS authorization protocol, to delegate a 3DS challenge decision of the transaction to a card program computing device within an issuer domain, wherein the card program computing device is a non-3DS certified service provider, and wherein the access control server provides the card program computing device with a limited period of time to determine the 3DS challenge decision and respond with a determination;
based on determining to delegate the 3DS challenge decision to the card program computing device as a non-3DS certified service provider, transmitting transaction information to the card program computing device along with a decision request message to authenticate the transaction by determining whether to challenge the transaction with additional authentication measures;
receiving, at the access control server, an indication to challenge the transaction in response to the decision request message;
providing, by the access control server, a challenge request that includes an additional authentication measure to a computing device associated with the digital electronic payment account; and
in response to receiving authentication of the additional authentication measure, transmitting an authentication response message to the payment computing network in real-time specifying that the transaction is authenticated.

16. The access control server of claim 15, wherein the operations further include validating that the first authentication request message is in a correct format to the 3DS authorization protocol by inspecting data attributes and values attributes in the first authentication request message.

17. The access control server of claim 15, wherein the operations further include determining to delegate the 3DS challenge decision to the card program computing device:
during a specific time period; or
based on multiple transactions being initiated in separate locations within a given time period.

18. The access control server of claim 15, wherein the operations further include determining to delegate the 3DS challenge decision to the card program computing device based on a transaction value or type of goods and services included in the transaction.

19. A computer-implemented method, comprising:
receiving, at an access control server via a payment computing network, a first authentication request message to authenticate a transaction associated with a digital electronic payment account;
determining, by the access control server, which is a three-domain secure (3DS) certified service provider using a 3DS authorization protocol, to delegate a 3DS challenge decision of the transaction to a card program computing device that is a non-3DS certified service provider, wherein the access control server provides the card program computing device with a limited period of time to respond with determination to the 3DS challenge decision;
based on determining to delegate the 3DS challenge decision to the card program computing device, transmitting transaction information to the card program computing device along with a decision request message to authenticate the transaction;
receiving, at the access control server, an indication to challenge the transaction in response to the decision request message;
providing, by the access control server, a challenge request that includes an additional authentication measure to a computing device associated with the digital electronic payment account; and
in response to receiving authentication of the additional authentication measure, transmitting an authentication response message to the payment computing network in real-time specifying that the transaction is authenticated.

20. The computer-implemented method of claim 19, wherein the decision request message to authenticate the transaction includes instructions to the card program computing device to determine whether to challenge the transaction with additional authentication measures.

* * * * *